US006959529B2

(12) United States Patent
Wübbels

(10) Patent No.: US 6,959,529 B2
(45) Date of Patent: Nov. 1, 2005

(54) MACHINE FOR MOWING STALK-LIKE CROPS INCLUDING A DRUM CONVEYOR EQUIPPED WITH CROP ENTRAINMENT ELEMENTS THAT SPAN A CROP TRANSPORT CHANNEL

(75) Inventor: Richard Wübbels, Rhede (DE)

(73) Assignee: Maschinenfabrik Kemper GmbH & Co.KG, Stadtlohn (DE)

( * ) Notice: Subject to any disclaimer, the term of this patent is extended or adjusted under 35 U.S.C. 154(b) by 0 days.

(21) Appl. No.: 10/359,353

(22) Filed: Feb. 5, 2003

(65) Prior Publication Data

US 2003/0159420 A1 Aug. 28, 2003

(30) Foreign Application Priority Data

Feb. 7, 2002 (DE) ................................ 102 04 950

(51) Int. Cl.[7] ................................................ A01D 45/02
(52) U.S. Cl. ............................................. 56/60; 56/157
(58) Field of Search .......................... 56/73, 13.6, 10.8, 56/11.2, 16.4 R, 102, 109, 119, 503, 502, 56/60, 51, 92, 94, 157

(56) References Cited

U.S. PATENT DOCUMENTS 4,212,143 A * 7/1980 Chaumont .................. 56/14.4
5,237,804 A 8/1993 Bertling ......................... 56/60
5,722,225 A 3/1998 Wuebbels et al. ............. 56/60
5,852,922 A * 12/1998 Over Behrens et al. ..... 56/14.7
6,073,429 A * 6/2000 Wuebbels et al. ........... 56/11.3
6,298,643 B1 * 10/2001 Wuebbels et al. ............. 56/60

FOREIGN PATENT DOCUMENTS

| | | |
|---|---|---|
| DE | 40 02 344 A1 | 1/1991 |
| EP | 05 08 189 A1 | 3/1992 |
| EP | 0 685 149 A1 | 4/1995 |
| EP | 0 760 200 A1 | 6/1996 |
| EP | 0 882 389 A1 | 6/1996 |
| EP | 0 860 106 A1 | 1/1998 |
| EP | 1 010 363 | 10/1999 |
| EP | 1 008 291 A1 | 11/1999 |
| EP | 1 106 049 | 12/2000 |

* cited by examiner

*Primary Examiner*—Árpád Fábián Kovács

(57) ABSTRACT

A forage harvester is equipped with a harvesting platform including a plurality of side-by-side mounted rotary collection and mowing drums that operate to feed stalk-like crops into a transport conduit located behind the collection and mowing drums. A pair of transport devices are mounted for rotating about respective axes located on opposite sides of a feed channel leading to an infeed channel of the forage harvester. The axes of rotation of the transport devices are tilted forward from the vertical and the transport devices include entrainment elements formed of disks having a plurality of long teeth formed thereabout, the long teeth projecting into the transport channel.

8 Claims, 2 Drawing Sheets

MACHINE FOR MOWING STALK-LIKE CROPS INCLUDING A DRUM CONVEYOR EQUIPPED WITH CROP ENTRAINMENT ELEMENTS THAT SPAN A CROP TRANSPORT CHANNEL

FIELD OF THE INVENTION

The invention relates to a machine for mowing stalk-like crops, with one or several laterally adjacent collection and mowing devices for separating and transporting the harvested crop and with a transport conduit through which the harvested crop can be transported by a drivable transport device, provided with entrainment elements, into the infeed conduit of a harvesting machine.

BACKGROUND OF THE INVENTION

As a rule, several collection and mowing devices are arranged laterally adjacent to each other in corn harvesters with a rather large working width. The crop from the collection and mowing devices is transported by conveyors in a transverse direction and then conveyed to the rear into a harvesting machine. In order to bridge the difference in height between the corn harvester and the infeed of the harvesting machine, oblique conveyors can be used that can also function simultaneously as transverse conveyors, and to which the crop is fed from one (U.S. Pat. No. 5,257,804) or two collection and mowing devices (EP 0 685 149 A). The use of oblique conveyors avoids having to position the axis of the collection and mowing devices obliquely to the front. DE 40 02 344 A describes a corn harvesting device wherein a large drum, which can rotate around the vertical axis and at first transports the crop laterally to the middle and then to the rear, is preceded by three smaller mowing drums. Transverse transport on the back side of the collection and mowing devices can be effected by transverse conveyors in cooperation with the collection and mowing devices (U.S. Pat. No. 5,752,225) or independently of them (EP 1 008 291 A).

It is possible, especially when deflecting plants, for parts of plants to fall down during the harvesting process, especially the relatively heavy fruit of corn plants. In known machines, the plant parts fall onto covers or other machine parts, and from there, or directly onto the ground, so that they are lost to the harvesting process.

SUMMARY OF THE INVENTION

The invention addresses the basic problem of making available an improved machine for mowing stalk-like crops.

The invention suggests arranging entrainment elements above the transport conduit at any desired position of the transport conduit through which the harvested plants are transported by the collection and mowing devices to the infeed conduit of a harvesting machine, the envelope circle of these entrainment elements extending beyond the opposite side of the transport conduit. The transport device is as a rule a conveyor separate from the collection and mowing device; however, it can also be a collection and mowing device provided with appropriate entrainment elements. It is preferable if intermediate spaces between the entrainment elements do not cover the transport conduit. The transport device, also as a rule, interacts with the plant parts located in the actual transport conduit.

A very compact transport device is obtained in this manner that nevertheless has a large effective range.

A cover can be located on the side of the transport conduit opposite the transport device and said cover adjoining the transport conduit. The projecting entrainment elements of the transport device can remove possibly fallen crop material from the cover or from other machine parts and reintroduce it into the flow of crop material. In particular, a collection and mowing device can be located under the cover.

The transport device can in particular be a drum conveyor with an at least approximately vertical axis of rotation. However, it would also be conceivable to use a belt conveyor. A suitable drum conveyor comprises at least a first transport disk or another element that comprises entrainment elements and is located inside the transport conduit. Located above it is a second transport disk or any other element carrying entrainment elements, these entrainment elements having an envelope circle extending over the transport conduit. Their envelope circle is also larger than that of the entrainment elements in the transport conduit. The entrainment elements in the transport conduit and/or the entrainment elements extending beyond it can be arranged in as many superposed planes as desired. Furthermore, other entrainment elements can be arranged above the entrainment elements extending beyond the transport conduit, the envelope circle of these other entrainment elements being smaller in contrast to the first ones.

The transport device can serve to transversely transport the crop from collection and mowing devices, arranged on either side of the middle of the machine, in the direction of the middle of the machine. Alternatively or additionally, it can transport toward the rear, counter to the direction of travel, to the infeed conduit of a harvesting machine supporting the machine. It is preferably designed as an oblique conveyor that transports the crop obliquely to the rear. In one embodiment, a sufficiently large transport device is used to function as a transverse conveyor and also as an oblique conveyor in order to first transport the crop laterally and then to the ear and obliquely upward into the infeed conduit of the harvesting machine. The transport device then performs the tasks otherwise tackled by two conveyors. The entrainment elements of the transport device, extending beyond the oblique transport conduit, function in the region of oblique transport as aggressive tines for the oblique transport.

In an especially advantageous embodiment of the invention, the transport device is arranged behind a transport conduit oriented obliquely to the direction of travel, and rotates counter to the collection and mowing device located upstream from it. The collection and mowing device located in front of it can rotate either in the same direction as the collection and mowing device by which the transport device is loaded with crop material or counter to it. The last-named variant has the advantage that the crop can be passed from the collection and mowing device located in front of the transport device directly, without deflection, to the rear into the infeed conduit of the harvesting machine, whereas only a transport device with sufficiently large dimensions can effect transport of the crop from the collection and mowing device located upstream of it into the infeed conduit. Since the transport device and the collection and mowing device located in front of it rotate in the same direction, but the transport conduit is located between them, the latter is separated, toward the front, by a wall from the collection and mowing device located in front of it.

BRIEF DESCRIPTION OF THE DRAWINGS

An embodiment of the invention that is described in detail is shown in the appended drawings.

DESCRIPTION OF THE PREFERRED EMBODIMENT

Figure 1:
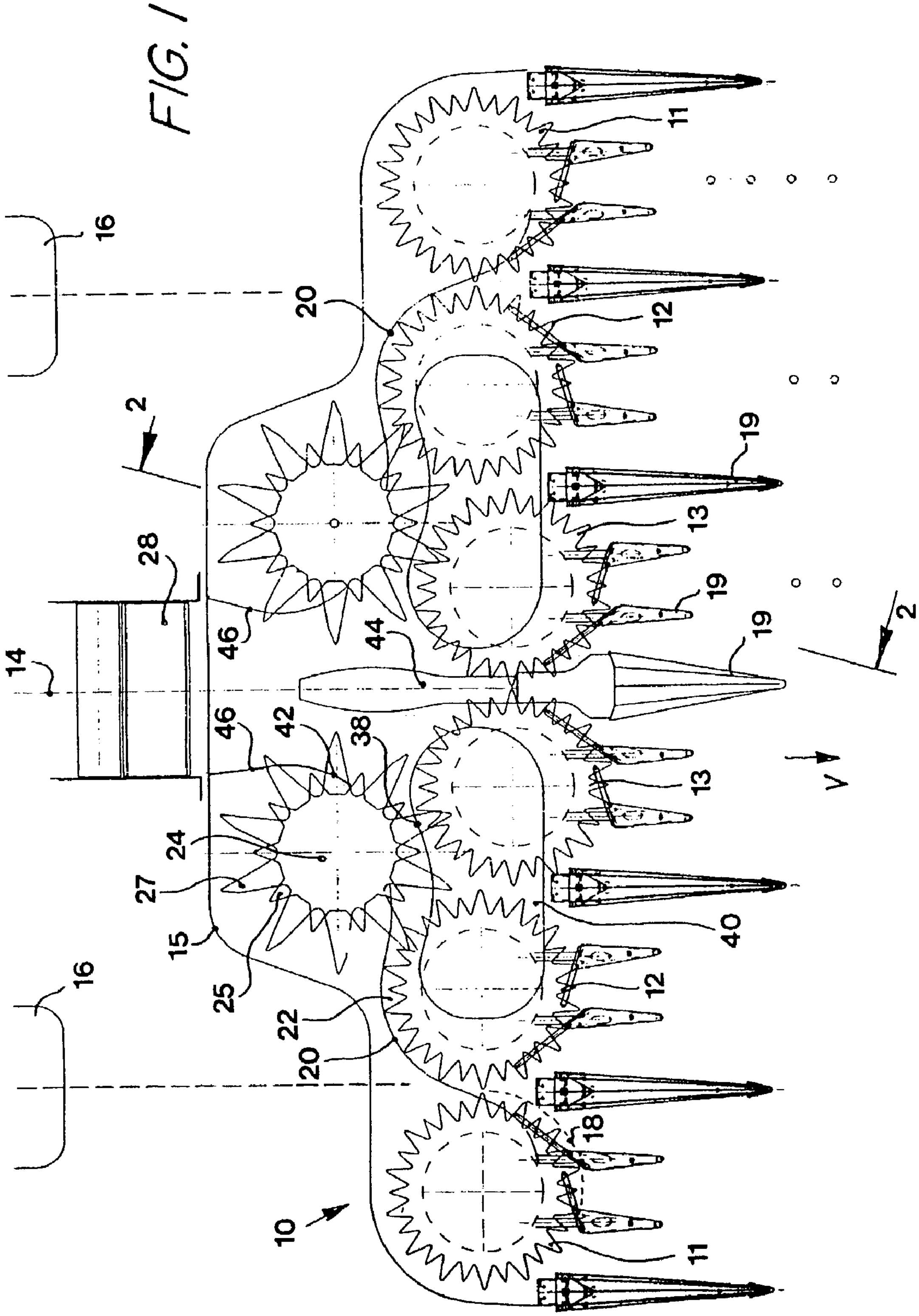
FIG. 1 is a schematic, top view of a machine constructed in accordance with the present invention for mowing stalk-like crops.

The platform or header 10 shown in FIG. 1 for mowing stalk-like crops comprises six collection and mowing drums 11, 12, and 13 that function as collection and mowing devices and are arranged symmetrically relative to a longitudinal median plane 14 of platform or header 10. Three collection and mowing drums 11, 12, 13 are present on each side of a longitudinal median plane 14. The platform or header 10 is supported by a frame 15. The frame 15 is carried by a harvesting machine in the form of a field chopper whose front wheels 16 are sketched in behind platform or header 10. Indications of direction such as in front, behind, and to the side refer in the following to a direction of travel V of the platform or header 10.

Collection and mowing drums 11, 12, 13, which operate in series independently, are each composed of a lower cutting disk 18 rotating about an approximately vertical axis, and of transport disks arranged coaxially above it whose circumference is provided with pocket-like recesses. Cutting disks 18 separate the upper parts of the harvested crop from the stubble remaining in the field. The crop stalks, which are in particular corn stalks, are taken up and held in the pocket-like recesses of the transport disks. Instead of all or a few of the rotating collection and mowing devices 11–13 shown, collection and mowing devices can also be used that are based on endless conveyors.

Stalk separators 19 are arranged in front of collection and mowing drums 11, 12, 13. A transport conduit 22 is oriented transversely to the direction of travel and is formed between the back side of collection and mowing drums 11, 12, 13, and back wall 20 of the platform or header 10 and is adapted in its form to the collection and mowing drums 12. The crop material harvested by the collection and mowing drums 11, 12, 13 is transported laterally to the center of the platform or header 10 via this transport conduit.

The outer two collection and mowing drums 11 are put in rotation such that the harvested crop is first transported laterally in the direction of longitudinal median plane 14, and then to the rear, counter to direction of travel V of machine 10. There, the crop is received by the first inner collection and mowing drum 12. This collection and mowing drum 12 rotates counter to the adjacent, outer collection and mowing drum 11, so that it transports the harvested crop laterally to the outside at first and subsequently to the rear. Collection and mowing drum 12 takes the harvested crop from outer collection and mowing drum 11 on its side facing outer collection and mowing drum 11. A remover that is constructed from metal sheets impinging into the envelope circle of outer collection and mowing drum 11, and that lifts the harvested crop out of its pocket-like recesses, effects the transition of the harvested crop to collection and mowing drum 12, on whose back side the crop is transported in cooperation with rear wall 20, inward in the direction of longitudinal median plane 14.

The crop is then lifted out of pocket-like recesses of collection and mowing drum 12 by a removal device (not shown) and received by a rotating transport device 24, arranged behind the drum, in the form of a combined transverse and oblique transport drum with its axis of rotation inclined slightly to the front. Transport device 24 is built from a cylindrical body with transport disks 29, 30, 32 fastened to it in a superposed manner, around whose circumference are distributed approximately triangular entrainment elements 25, 27 for transporting the crop. Fingers can also be used instead of tooth-like entrainment elements 25, 27. A control of entrainment elements 25 and/or 27 that effects a radial shifting and/or azimuthal rotation of the entrainment elements 25 and/or 27 in order to improve the transport of crops is also conceivable. The region of transport device 24 oriented approximately transversely to direction of travel V penetrates slots in rear wall 20. Rear wall 20 ends in the vicinity of the cylindrical body of transverse and oblique transport drum 24.

The envelope circle of transport device 24 does not enter into the envelope circle of collection and mowing drum 12. It would, however, be conceivable to lengthen entrainment elements 25 appropriately so that they enter into this envelope circle. Transport device 24 transports the crop along wall 38 that is fixed, or can be moved against force, is located in front of this transport device, relative to direction of travel V, and is arranged below cover 40 covering first outer collection and mowing drum 12 and inner collection and mowing drum 13.

Figure 2:
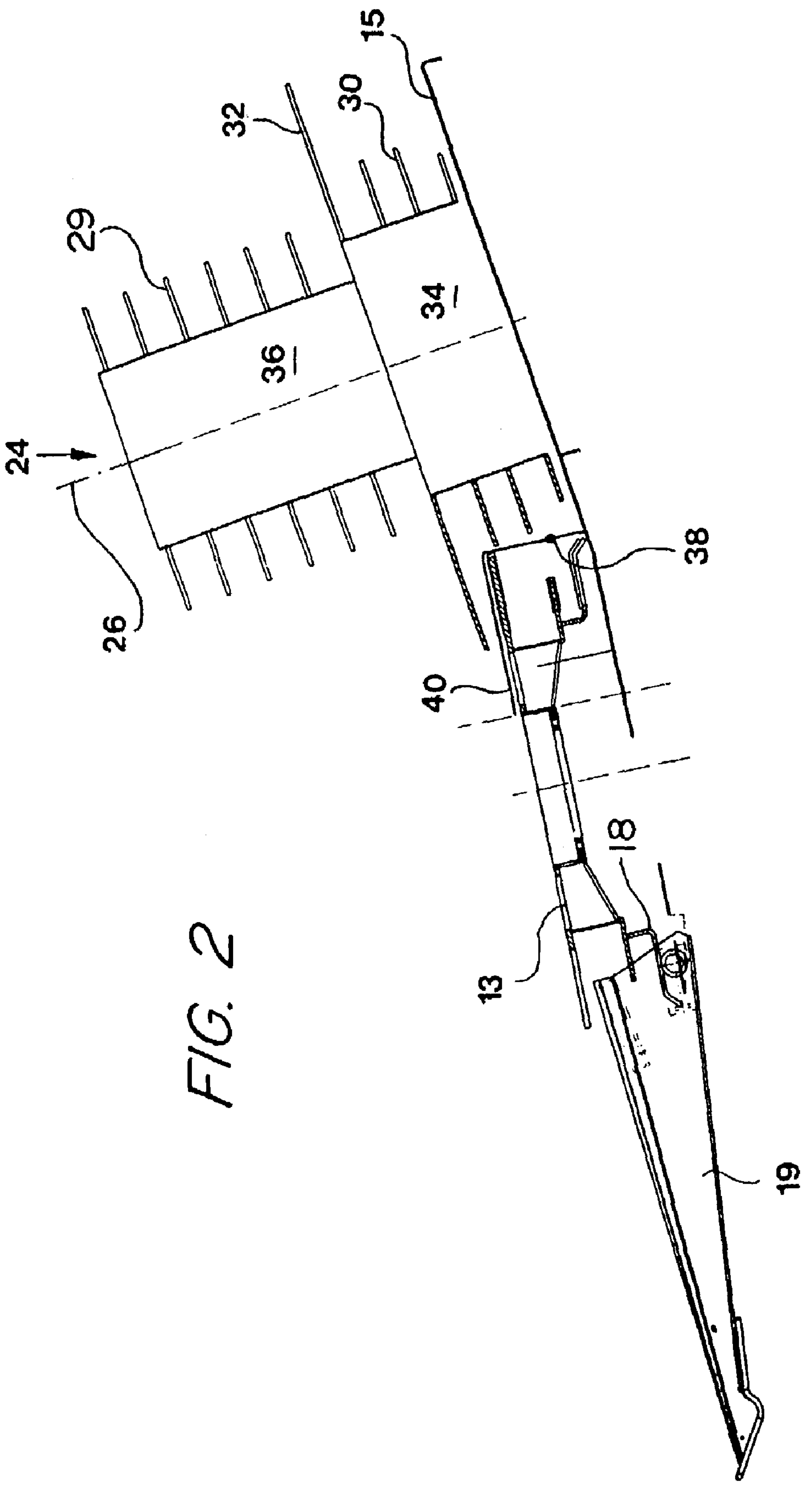
FIG. 2 is a vertical sectional view taken along line 2—2 of FIG. 1.

Since the diameter of transport device 24 is relatively large and its axis of rotation 26 is inclined to the front (see FIG. 2), it also functions as a deflecting transport unit that transports the crop, following transport along wall 38, to the rear and upward into infeed conduit 28 of the harvesting machine in which collection rollers are superposed. Transport device 24 is built up from a cylindrical body with superposed, cogged transport disks 29, 30, 32 on which entrainment elements 25, 27 are defined. Transport device 24 comprises a lower section 34 provided with three superposed transport disks 30 around whose circumferences entrainment elements 25 are distributed.

The height of lower section 34 corresponds approximately to the height of transport conduit 22. The lowest disk of transport disks 30 has a somewhat smaller diameter than transport disks 30 arranged above it. Transport disk 32, with a diameter greater than that of transport disks 30, is located at the top of lower section 34, with entrainment elements 27 being defined on the circumference of their disk which extend beyond cover 40. Lower section 34 of the body of transport device 24 is followed by upper section 36 whose diameter is smaller than that of lower section 34. The upper section is provided with six superposed transport disks 29 whose diameter is smaller than that of transport disks 30 and greater than the diameter of lower section 34. Transport disks 30 of lower section 34 substantially transport the crop parts located further up and removes any parts, especially fruit, that may have fallen onto cover 40 from the plants, and reintroduces them into the crop flow. Upper transport disks 29 also transport the upper plant parts standing above transport conduit 22.

Wall 38 also acts as a removal device for inner collection and mowing drums 13. Another removal device 42 lifts the harvested crop on the output side out of transport devices 24. The crop slides downstream from removal device 42 along side walls 46 until it reaches infeed conduit 28. The crop is aggressively transported in the area between transport devices 24 by relatively long entrainment elements 27.

Transport devices 24 thus act in transport conduit 22 on the crop harvested by outer collection and mowing drums 11, 12, this conduit being separate front inner collection and mowing drums 13 and independent of them. In order to be able to realize this transport conduit 22 without having to deflect the crop flow in it in an undesirable manner, and without substantially enlarging the length of the machine 10, measured in the direction of travel V, at least in the vicinity of middle or outer collection and mowing drums 11, 12, the axes of rotation of inner collection and mowing drums 13 are offset to the front, in the direction of travel V, relative to the other collection and mowing drums 11, 12. The drive of collection and mowing drums 11, 12, 13 and of transport devices 24 is effected by means of the harvesting machine via suitable transmissions.

Inner collection and mowing drums 13 rotate counter to the closest outer collection and mowing drums 12 so that they at first transport the crop inward in the direction of the longitudinal central plane of machine 10 and then to the rear when machine 10 is moved over a field in the direction of travel V during the harvesting process. The crop harvested by the inner collection and mowing drums 13 is lifted out of them by removers, flows practically without deflection through a part of a conduit extending in the direction of travel, this being located between a central guide element 44 arranged on the bottom of the machine 10 and the remover, and being united with the crop flow from transport conduit 2 beside and slightly in front of transport devices 24. The united crop flow then flows further in a straight line through the part of the conduit located between guide element 44 and transport device 24 into infeed conduit 28 of the harvesting machine, where it is chopped and from which it is placed on a wagon.

For embodiments with a larger working width, the embodiment presented can be modified by adding collection and mowing drums 12 and transverse transport drums arranged in the nip area of adjacent collection and mowing drums 12.

Having described the preferred embodiment, it will become apparent that various modifications can be made without departing from the scope of the invention as defined in the accompanying claims.

What is claimed is:

1. In a crop harvesting platform for harvesting stalk-like crops, a frame supporting a plurality of laterally adjacent collection and mowing devices for separating and transporting the harvested crop, a transport conduit defined behind at least some of said collection and mowing devices through which the harvested crop can be transported, and at least one driven transport device being associated with said transport conduit and mounted for rotation about an upright axis located on each side of a central median plane of said platform and behind said transport conduit and acting to move crop rearwardly along a discharge path located along said median plane, the improvement comprising: each transport device including entrainment elements located above said transport conduit and which describe an envelope circle which extends beyond said transport conduit on a side of said transport conduit opposite from the associated upright axis of each said transport device.

2. The crop harvesting platform, as defined in claim 1, wherein a horizontal cover, above which passes said envelope circle of each said transport device, is arranged to border said transport conduit in said location of said transport conduit opposite each transport device.

3. The crop harvesting platform, as defined in claim 2, wherein at least one of said plurality of collection and mowing devices is located beneath said cover.

4. The crop harvesting platform, as defined in claim 1, wherein each transport device is a drum conveyor with said upright axis of rotation being approximately vertical.

5. The crop harvesting platform, as defined in claim 1, wherein said transport device includes other entrainment elements which extend into said transport conduit and have an envelope circle less than that of said entrainment elements which are located above, and extend beyond, said transport conduit.

6. The crop harvesting platform, as defined in claim 5, wherein said transport device includes further entrainment elements which are located at a height above said transport conduit and which have an envelope circle less than that of said entrainment elements which are located above, and extend beyond, said transport conduit.

7. The crop harvesting platform, as defined in claim 1, wherein each said transport device is arranged, relative to the direction of travel of the platform, behind and adjacent to, at least one of said plurality of collection and mowing devices; and said transport device moving in a direction counter to a direction of rotation of said a least one of said plurality of collection and mowing devices.

8. The harvesting platform, as defined in claim 7, wherein said transport conduit includes a forward, vertical wall; and each of said transport devices being located behind an adjacent collection and mowing device that rotates in the same direction as said transport device and is located on an opposite side of said vertical wall from said transport device.

* * * * *